Figure 1:
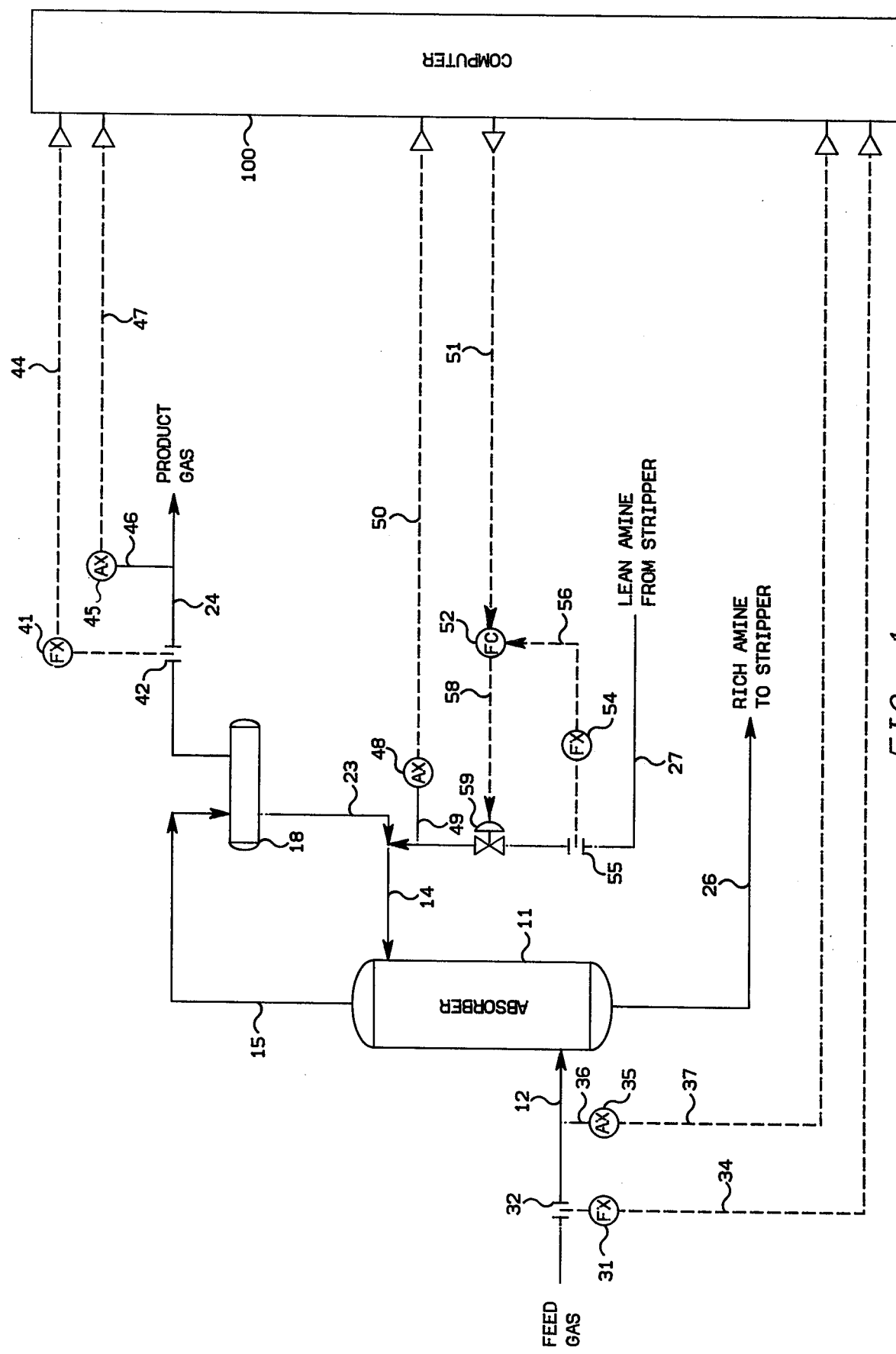

United States Patent
Stewart

[11] 4,435,192
[45] Mar. 6, 1984

[54] CONTROL OF A $H_2S$ ABSORBER

[75] Inventor: William S. Stewart, Bartlesville, Okla.

[73] Assignee: Phillips Petroleum Company, Bartlesville, Okla.

[21] Appl. No.: 444,140

[22] Filed: Nov. 24, 1982

[51] Int. Cl.³ .............................................. B01D 53/14
[52] U.S. Cl. ......................................... 55/19; 55/37; 55/48; 55/73; 423/220; 423/228
[58] Field of Search .................... 55/18, 19, 21, 37, 46, 55/48, 73, 210, 225, 227; 196/132; 423/228, 229, 220

[56] References Cited

U.S. PATENT DOCUMENTS

| | | | |
|---|---|---|---|
| 3,090,683 | 5/1963 | Berger | 48/196 |
| 3,446,709 | 5/1969 | Marshall | 196/132 |
| 3,917,931 | 11/1975 | Sweeney | 55/18 |
| 3,967,937 | 7/1976 | Hobbs | 55/18 |
| 4,106,916 | 8/1978 | Tuckett | 55/21 |
| 4,289,738 | 9/1981 | Pearce | 423/228 |

*Primary Examiner*—Ernest G. Therkorn

[57] ABSTRACT

In an absorption process in which an absorption medium is utilized to absorb $H_2S$ from a feed gas containing $H_2S$, the flow rate of the lean absorption medium is manipulated so as to maintain the actual $H_2S$ concentration in the product gas stream from the absorption process substantially equal to a desired value for the $H_2S$ concentration. However, if the $H_2S$ concentration in the rich absorption medium stream exceeds a high limit, the control of the lean absorption medium flow rate so as to maintain a desired $H_2S$ concentration in the product gas stream is overridden until such time as the $H_2S$ concentration in the rich absorption medium stream is below the high limit.

8 Claims, 2 Drawing Figures

CONTROL OF A H₂S ABSORBER

This invention relates to control of a H₂S absorption process. In one aspect, this invention relates to method and apparatus for minimizing the flow rate of the lean absorption medium while still maintaining desired process conditions.

The purpose of an H₂S absorption process is to reduce the concentration of hydrogen sulfide (H₂S) in a gas stream to a specified value. This process is commonly referred to as a gas sweetening process and is utilized in gasoline plants, natural gas liquifaction plants, refineries and petrochemical plants. Essentially, an absorption medium capable of absorbing H₂S (an amine such as a diisopropanol amine is utilized and the absorption medium will be referred to hereinafter as an amine even though any suitable absorption medium such as a potassium carbonate could be used) is contacted with the feed gas containing H₂S. The H₂S is absorbed by the amine and the feed gas, having a substantially reduced concentration of H₂S, is removed. The amine is then regenerated and recycled back to the absorption process.

As used herein, the term "lean amine" refers to the amine which contains a small concentration, if any, of H₂S, that is utilized to contact the gas feed. The term "rich amine" refers to the amine, which contains a considerable concentration of H₂S which has been absorbed from the feed gas, being removed from the absorption process for regeneration.

Typically, there will be a specified H₂S concentration for the feed gas which is removed as a product from the absorption process. Ideally, the absorption process will be controlled to maintain the H₂S concentration at this desired level since, if the H₂S concentration is too high, the gas cannot be sold or used for environmental reasons and, if the H₂S concentration is lower than the desired value, the operating cost of the amine process is excessively high because higher flow rates of the lean amine are being used than necessary. However, care must be taken not to reduce the lean amine flow rate too much since a reduction in the lean amine flow rate will increase the concentration of H₂S in the rich amine. As the H₂S concentration increases in the rich amine, the rich amine becomes more corrosive and there is a high limit on the H₂S concentration in the rich amine that should not be exceeded if damage to the process equipment is to be avoided. Thus, it is an object of this invention to control an amine absorption process so as to maintain the H₂S concentration in the product gas stream substantially at a desired value without allowing the concentration of H₂S in the rich amine to exceed a high limit.

In accordance with the present invention, method and apparatus is provided whereby the flow rate of the lean amine is manipulated so as to maintain the actual H₂S concentration in the product gas stream substantially equal to a desired value for the H₂S concentration. However, if the H₂S concentration in the rich amine stream exceeds a high limit, the control of the lean amine flow rate so as to maintain a desired H₂S concentration in the product gas stream is overridden until such time as the H₂S concentration in the rich amine stream is below the high limit. In this manner, the economics of the H₂S absorption process are maximized while ensuring that damage does not occur to the process equipment because of an excessive H₂S concentration in the rich amine.

Figure 2:
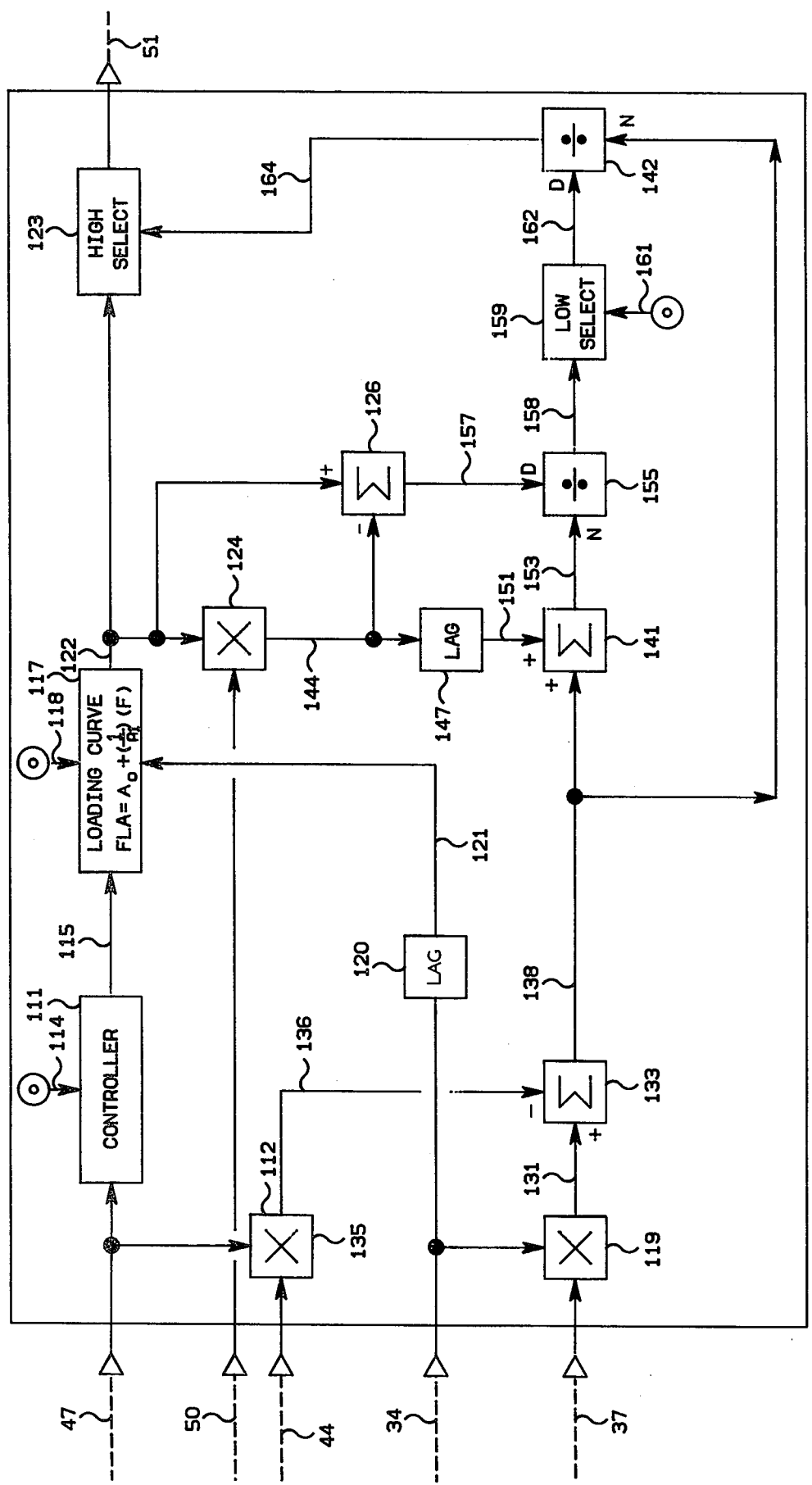

Other objects and advantages of the invention will be apparent from the foregoing brief description of the invention and the claims as well as the detailed description of the drawings which are briefly described as follows:

FIG. 1 is a diagrammatic illustration of a amine absorption process and an associated control system for the amine absorption process; and FIG. 2 is a flow diagram of the manner in which the process measurements illustrated in FIG. 1 are utilized to derive the control signal illustrated in FIG. 1 which manipulates the lean amine flow rate.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signal based on measured process parameters as well as set points applied to the computer. Analog computers or other types of computing devices could also be used in the invention. The digital computer is preferably an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, a feed gas (typically natural gas) is provided to a lower portion of the absorption column 11 through conduit means 12. A lean amine which is capable of absorbing $H_2S$ from the feed gas flowing through conduit means 12 is provided to an upper portion of the absorption column 11 through conduit means 14. The lean amine flows down the absorption column and is contacted with the feed gas under conditions at which a substantial portion of the $H_2S$ contained in the feed gas is absorbed.

Feed gas having a substantially reduced concentration of $H_2S$ is removed from the absorption column 11 through conduit means 15 and is provided to the overhead accumulator 18, which acts as a liquid knockout pot. Generally, any of the lean amine which may have been removed through conduit means 15 is separated from the gas in the overhead accumulator 18. The lean amine is removed from the overhead accumulator through conduit means 23. The flow rate of the lean amine through conduit means 23 will be substantially equal to the flow rate of the lean amine through conduit means 15.

The lean amine flowing through conduit means 23 is recycled to the absorption column 11 through conduit means 14. Product gas is removed from the overhead accumulator 18 through conduit means 24.

Rich amine is removed from the absorption column 11 through conduit means 26. The rich amine is typically provided to a stripping column in which the absorbed $H_2S$ is substantially removed and the stripped rich amine is recycled from the stripping column to the absorption column 11 through the combination of conduit means 27 and 14. Since the stripping operation does not play any part in the description of the present invention, the stripping operation has not been illustrated.

The absorption process described to this point is a conventional absorption process. Conventional equipment not required for an explanation of the invention such as pumps, heat exchangers, additional control components and other typical absorption process equipment have not been illustrated for the sake of simplicity.

Flow transducer 31 in combination with a flow sensor 32, which is operably located in conduit means 12, provides an output signal 34 which is representative of the actual flow rate of the feed gas through conduit means 12. Signal 34 is provided from the flow transducer 31 as an input to computer 100.

The analyzer transducer 35 is in fluid communication with conduit means 12 through conduit means 36. The analyzer transducer is preferably a chromatographic analyzer such as the Model 102, Process Chromatograph from Applied Automation, Inc., Barrtlesville, Okla., which is capable of providing an output signal 37 which is representative of the concentration of $H_2S$ in the feed gas flowing through conduit means 12. Signal 37 is provided from the analyzer transducer 35 an an input to computer 100.

Flow transducer 41 in combination with the flow sensor 42, which is operably located in conduit means 24, provides an output signal 44 which is representative of the actual flow rate of the product gas through conduit means 24. Signal 44 is provided from the flow transducer 42 as an input to computer 100.

Analyzer transducer 45 is in fluid communication with conduit means 24 through conduit means 46. Analyzer transducer 48 is in fluid communication with conduit means 27 through conduit means 49. Both analyzer transducer 45 and 48 would typically be the same type of analyzer as the analyzer transducer 35 (one analyzer would many times be used to perform the three analyses). Analyzer transducer 45 provides an output signal 47, which is representative of the actual concentration of $H_2S$ in the product gas stream, to computer 100. Analyzer transducer 48 provides an output signal 50, which is representative of the actual concentration of $H_2S$ in the lean amine stream, to computer 100.

In response to the described process measurements, computer 100 provides a control signal 51 which is representative of the desired flow rate of the lean amine flowing through conduit means 27. The manner in which the magnitude of signal 51 is calculated will be described more fully hereinafter. Signal 51 is provided from computer 100 as the set point input to the flow controller 52.

Flow transducer 54 in combination with the flow sensor 55, which is operably located in conduit means 27, provides an output signal 56 which is representative of the actual flow rate of the lean amine through conduit means 27. Signal 56 is provided from the flow transducer 54 as the process variable input to the flow controller 52. In response to signals 51 and 56, the flow controller 52 provides an output signal 58 which is responsive to the difference between signals 51 and 56. Signal 58 is scaled so as to be representative of the position of the control valve 59, which is operably located in conduit means 27, required to maintain the actual flow rate of the lean amine through conduit means 27 substantially equal to the desired flow rate represented by signal 51. Signal 58 is provided from the flow controller 52 as the control signal for the control valve 59 and the control valve 59 is manipulated in response thereto.

Referring now to FIG. 2, signal 47, which is representative of the actual concentration of $H_2S$ in the product gas flowing through conduit means 24, is provided as an input to the controller block 111 and is also provided as an input to the multiplying block 112. The controller block 111 is also provided with a set point signal 114 which is representative of the desired concentration of $H_2S$ in the product gas.

In response to signals 47 and 114, the controller block 111 provides an output signal 115 which is responsive to the difference between signals 47 and 114. Signal 115 is utilized to compensate for any errors in the operator's estimate of the lean amine required for each SCF of feed gas to maintain the desired concentration represented by signal 114. Signal 115 is provided from the controller block 111 to the loading curve block 117.

The loading curve block 117 is also provided with signal 118 which is representative of an operator's estimate of the number of standard cubic feet of feed gas which can be provided to the absorber column 11 per unit time for each gallon of the lean amine which flows down the absorption column 11 (the flow rate of the lean amine down the absorption column 11 is considered to be the same as the flow rate of the lean amine through conduit means 27 since any lean amine lost in the overhead stream is replaced by the lean amine flowing through conduit means 23).

Signal 34, which is representative of the actual flow rate of the feed gas flowing through conduit means 12, is provided as an input to the multiplying block 119 and is also provided as an input to the lag block 120. The lag block 120 is essentially a delay utilized to compensate for the time required for the feed gas to flow from the bottom of the absorption column 11 to the top. The delay is typically about one-half minute. Signal 121, which is representative of the lagged feed flow rate, is provided as an input to the loading curve block 117.

The loading curve block 117 utilizes the equation illustrated in FIG. 2 to calculate the magnitude of signal 122 which is representative of the flow rate of the lean amine through conduit means 27 required to maintain the actual concentration of $H_2S$ in the product gas substantially equal to the desired concentration. Essentially, signal 115 is representative of $A_0$, signal 118 is representative of $A_1$ and signal 121 is representative of F in the equation illustrated. The term $(1/A_1)(F)$ represents an operator's estimate of the required flow rate of the lean amine through conduit means 27. If the operator's estimate is exact, then the term $A_0$ will be 0. However, at such times when process conditions are such that the operator's estimate is not exact, the controller block 111 will act to calculate a magnitude for signal 115 ($A_0$) which will have the effect of biasing the operator's estimate so as to maintain signal 122 at a value which is representative of a flow rate of the lean amine which will maintain the concentration of $H_2S$ in the product stream substantially equal to the desired concentration. The term $(1/A_1) F$ may be considered a feed forward control term since a change in the feed flow rate will affect this term while the term $A_1$ may be considered a feed back control term since it is based on an analysis of the product gas. Signal 122 is provided from the loading curve block 117 as an input to the high select block 123, as an input to the multiplying block 124 and to the minuend input of the summing block 126.

Signal 37, which is representative of the actual $H_2S$ concentration in the feed gas, is provided as a second input to the multiplying block 119. Signal 37 is multiplied by signal 34 to establish signal 131 which is representative of the actual flow rate of $H_2S$ to the absorber column 11. Signal 131 is provided from the multiplying block 119 to the minuend input of the summing block 133.

Signal 44, which is representative of the actual flow rate of the product gas flowing through conduit means 24, is provided as a second input to the multiplying block 135. Signal 44 is multiplied by a signal 47 to establish signal 136 which is representative of the actual flow rate of $H_2S$ through conduit means 24. Signal 136 is provided from the multiplying block 112 to the subtrained input of the summing block 133.

Signal 136 is subtracted from signal 131 to establish signal 138 which is representative of the rate at which $H_2S$ is being absorbed from the feed gas in the absorption column 11. Signal 138 is provided from the summing block 133 as an input to the summing block 141 and to the numerator input of the dividing block 142.

Signal 50, which is representative of the concentration of $H_2S$ in the lean amine flowing through conduit means 27, is provided as a second input to the multiplying block 124. Signal 50 is multiplied by signal 122 to establish signal 144 which is representative of the flow rate of $H_2S$ through conduit means 27. Signal 144 is provided from the multiplying block 124 to the lag block 147 and to the subtrahend input of the summing block 126.

The lag block 147 is utilized to compensate for the time required for liquid to flow from the top of the absorber column 11 to the bottom of the absorber column 11. A typical time is about four minutes. Signal 151, which is representative of a lagged flow rate of $H_2S$ through conduit means 27, is provided from the lag block 147 as a second input to the summing block 141.

Signals 138 and 151 are summed to establish signal 153 which is representative of the total flow rate of $H_2S$ through conduit means 26. Signal 153 is provided from the summing block 141 to the numerator input of the dividing block 155.

Signal 144 is subtracted from signal 122 to establish signal 157 which is representative of the actual flow rate of only the absorption medium through conduit means 27. Signal 157 is provided to the denominator input of the dividing block 155. Since the flow rate of the absorption medium through conduit means 27 will generally be approximately equal to the flow rate of the absorption medium through conduit means 26, signal 157 is representative of the flow rate of the absorption medium only through conduit means 26. Signal 153 is divided by signal 157 to establish signal 158 which is representative of the actual ratio of the $H_2S$ contained in the rich amine to the absorption medium contained in the rich amine (such a ratio may also be considered as being representative of a concentration of $H_2S$ in the rich amine stream). Thus, if signal 158 has a magnitude of 0.1, there are 0.1 gallons of $H_2S$ for every 1 gallon of absorption medium in the rich amine. Signal 158 is provided from the dividing block 155 as an input to the low select block 159.

The low select block 159 is also provided with signal 161 which is representative of a high limit on the ratio of $H_2S$ to absorption medium in the rich amine. The lower of signals 158 and 161 is selected by the low select block to be provided as signal 162 to the denominator input of the dividing block 142.

Signal 138 is divided by signal 162 to establish signal 164 which is representative of the flow rate of the lean amine required to maintain the actual ratio of $H_2S$ to absorption medium in the rich amine substantially equal to the ratio represented by signal 162. Signal 164 is provided from the dividing block 142 as a second input to the high select block 123.

The higher of signals 122 and 164 is selected by the high select block 123 to be provided as the output signal 51 from computer 100. Signal 51 is utilized as has been previously described.

In summary, a plurality of calculations are utilized to calculate the ratio of $H_2S$ to absorption medium in the rich amine. This calculation is utilized to prevent signal 161 from entering into the control action until such time as the actual ratio becomes greater than the high limit on the ratio represented by signal 161.

In general, signal 122 will be the controlling signal since under most circumstances the $H_2S$ to absorption medium ratio in the rich amine will remain below the high limit represented by signal 161. However, in those circumstances in which the ratio does exceed the high limit represented by signal 161, signal 164 will assume a magnitude which is greater than the magnitude of signal 122 thus causing signal 164 to be selected as the control signal 51 which will have the effect of increasing the lean amine flow rate. This will force the $H_2S$ to absorption medium ratio in the rich amine to remain equal to the high limit and will also have the effect of reducing the $H_2S$ concentration of the product gas below the desired value. However, damage to the process equipment will be prevented and control will be returned to the basis of maintaining a desired $H_2S$ concentration in the product gas as soon as the $H_2S$ to absorption medium ratio in the rich amine goes below the high limit represented by signal 161. Thus, the economics of the absorption process are substantially maximized while ensuring that damage to process equipment does not occur because the $H_2S$ to absorption medium ratio goes above a high limit.

The invention has been described in terms of a preferred embodiment as illustrated in FIGS. 1 and 2. Specific control components which can be used in the practice of the invention as illustrated in FIG. 1 such as flow transducers 31, 41 and 54; flow sensors 32, 42, and 55; flow controller 52; and control valve 59 are each well known, commercially available control components such as are illustrated and described at length in Perry's Chemical Engineers Handbook, 4th Edition, Chapter 22, McGraw-Hill.

While the invention has been described in terms of the presently preferred embodiment, reasonable variations and modifications are possible by those skilled in the art and such variations and modifications are within the scope of the described invention and the appended claims.

That which is claimed is:

1. A method for controlling an absorption process wherein a feed gas containing $H_2S$ is contacted with a lean absorption medium, suitable for removing said $H_2S$ from said feed gas, in an absorption column, wherein a product gas stream having a substantially reduced concentration of $H_2S$ with respect to said feed gas is removed from an upper portion of said absorption column and wherein a rich absorption medium containing the $H_2S$ removed from said feed gas is removed from a lower portion of said absorption column, said method comprising the steps of:

establishing a first signal representative of the flow rate of said lean absorption medium to said absorption column required to maintain the actual concentration of $H_2S$ in said product gas stream substantially equal to a desired concentration;

establishing a second signal representative of the flow rate of said lean absorption medium to said absorption column required to maintain the actual $H_2S$ concentration in said rich absorption medium at or below a high limit for the actual concentration of $H_2S$ in the rich absorption medium;

establishing a third signal which is equal to the one of said first and second signals which is representative of the highest flow rate of said lean absorption medium; and manipulating the flow rate of said lean absorption medium to said absorption column in response to said third signal.

2. A method in accordance with claim 1 wherein said step of establishing said first signal comprises:

establishing a fourth signal representative of the actual $H_2S$ concentration in said product gas stream;

establishing a fifth signal representative of the desired $H_2S$ concentration in said product gas stream;

comparing said fourth signal and said fifth signal and establishing a sixth signal which is responsive to the difference between said fourth signal and said fifth signal;

establishing a seventh signal representative of the actual flow rate of said feed gas;

delaying said seventh signal by a time substantially equal to the time required for said feed gas to flow from a lower portion of said absorption column means to an upper portion to establish an eighth signal;

establishing a ninth signal representative of an estimate of the number of units of said feed gas which can be provided to said absorption column means per unit of said lean absorption medium provided to said absorption column means while still maintaining the actual $H_2S$ concentration in said product gas substantially equal to the desired concentration represented by said fifth signal;

dividing 1 by the magnitude of said ninth signal to establish a tenth signal;

multiplying said eighth signal and said tenth signal to establish an eleventh signal; and adding said eleventh signal and said sixth signal to establish said first signal, wherein said sixth signal is scaled so as to be representative of the flow rate of said lean absorption medium required to compensate for errors in the estimate represented by said ninth signal.

3. A method in accordance with claim 1 wherein said step of establishing said second signal comprises:

establishing a fourth signal representative of the actual concentration of $H_2S$ in said rich absorption medium;

establishing a fifth signal representative of a high limit for the $H_2S$ concentration in said rich absorption medium;

establishing a sixth signal which is equal to the one of said fourth and fifth signals which is representative of the lower concentration of $H_2S$ in said rich absorption medium;

establishing a seventh signal representative of the actual amount of $H_2S$ absorbed per unit time from said feed gas in said absorption column; and dividing said seventh signal by said sixth signal to establish said second signal.

4. A method in accordance with claim 3 wherein said step of establishing said fourth signal comprises:

establishing a eighth signal representative of the actual concentration of $H_2S$ in said lean absorption medium;

multiplying said eighth signal by said first signal to establish a ninth signal representative of the actual flow rate of $H_2S$ in said lean absorption medium;

delaying said ninth signal by a time substantially equal to the time required for liquid to flow from the upper portion of said absorption column to a lower portion of said absorption column to establish a tenth signal;

summing said tenth signal and said seventh signal to establish an eleventh signal representative of the total flow rate of $H_2S$ in said rich absorption medium;

subtracting said ninth signal from said first signal to establish a twelfth signal which is representative of the flow rate of only the absorption medium in said lean absorption medium; and dividing said eleventh signal by said twelfth signal to establish said fourth signal.

5. A method in accordance with claim 3 wherein said step of establishing said seventh signal comprises:

establishing an eighth signal representative of the actual flow rate of said feed gas to said absorption column;

establishing a ninth signal representative of the actual concentration of $H_2S$ in the feed gas flowing to said absorption column;

multiplying said eighth signal and said ninth signal to establish a tenth signal representative of the flow rate of $H_2S$ to said absorption column;

establishing an eleventh signal representative of the actual flow rate of said product gas stream;

establishing a twelth signal representative of the actual concentratin of $H_2S$ in said product stream;

multiplying said eleventh signal and said twelfth signal to establish a thirteenth signal representative of the actual flow rate of $H_2S$ in said product stream; and subtracting said thirteenth signal from said tenth signal to establish said seventh signal.

6. A method in accordance with claim 1 wherein the removal of said product gas stream from an upper portion of said absorption column is accomplished by withdrawing an overhead stream from an upper portion of said absorption column, providing the thus withdrawn overhead stream to a knockout pot and withdrawing the gas from said knockout pot as said product gas stream.

7. A method in accordance with claim 6 wherein said lean absorption medium is provided to said absorption column by providing a primary stream of lean absorption medium to said absorption column and providing the liquid withdrawn from said knockout pot to said absorption column as a secondary lean absorption medium stream.

8. A method in accordance with claim 7 wherein said step of manipulating the flow rate of said lean absorption medium to said absorption column in response to said third signal comprises:

establishing a fourth signal representative of the actual flow rate of said periphery lean absorption medium stream;

comparing said third signal and said fourth signal and establishing a fifth signal which is responsive to the difference between said third signal and said fourth signal, wherein said fifth signal is scaled so as to be representative of the position of a control valve operatively located so as to manipulate the flow rate of said primary lean absorption medium required to maintain the actual flow rate of said primary lean absorption medium substantially equal to the desired flow rate represented by said third signal; and manipulating said control valve in response to said fifth signal.

* * * * *